United States Patent Office 3,294,631
Patented Dec. 27, 1966

3,294,631
PESTICIDAL ASYMMETRIC THIOL- OR THIONO-
THIOL-PHOSPHORIC ACID ESTERS
Walter Lorenz, Wuppertal-Vohwinkel, Reimer Colln, Wuppertal-Elberfeld, Gerhard Schrader, Wuppertal-Cronenberg, and Günter Unterstenhöfer, Opladen, Germany, assignors to Farbenfabriken Bayer Aktiengesellschaft, Leverkusen, Germany, a corporation of Germany
No Drawing. Filed Dec. 29, 1964, Ser. No. 422,011
Claims priority, application Germany, Jan. 4, 1964,
F 41,674
23 Claims. (Cl. 167—33)

The present invention relates to asymmetric thiol- or thionothiol-phosphoric acid esters, and to a process for their production, and to new compositions containing the same as well as methods of using such esters to combat pests, and more particularly the present invention relates to esters of the foregoing type and a process for the production of such asymmetric thiol- or thionothiol-phosphoric acid esters of the general formula

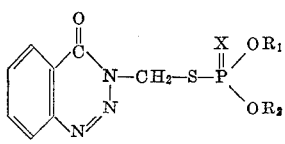

in which $R_1$ stands for a linear alkyl group, while $R_2$ represents a branched alkyl radical or a cycloalkyl radical and X is an oxygen or sulphur atom.

In particular, the symbol $R_1$ denotes linear lower alkyl radicals with 1–4 carbon atoms, such as the methyl or ethyl radical; $R_2$ chiefly stands for the isopropyl, sec.- and tert.-butyl group and also for the pinacolyl and cyclohexyl group.

It is an object of the present invention to provide organic asymmetric thiol- or thionothiol-phosphoric acid esters of the foregoing type and a process for their production.

It is a further object of the present invention to provide such asymmetric phosphoric acid esters which are useful for pest control purposes, these compounds possessing outstanding pesticidal and especially insecticidal and acaricidal properties.

It is a still further object of the present invention to provide pesticidal compounds and compositions containing the asymmetric phosphoric acid esters of the instant type, which may be used effectively to control pests on plant crops.

It is a still further object of the present invention to provide asymmetric phosphoric acid esters of the foregoing type which have a comparatively high thermal stability as well as a comparatively low solubility in water resulting in a reduced phytotoxicity.

It is a still further object of the present invention to provide a process for producing such asymmetric phosphoric acid esters starting from asymmetric O,O-dialkyl- or O-alkyl-O-cycloalkyl-thiol- or -thionothiol-phosphoric acids and N-halomethyl benzazimides.

It is a still further object of the present invention to provide a method for controlling pests and especially insects and acarids which contemplates applying thereto and to their habitats asymmetric phosphoric acid esters derived in accordance with the foregoing.

Other and further objects of the present invention will become apparent from a study of the within specification and accompanying examples.

The reaction according to the present process is preferably carried out in the presence of inert organic solvents. Suitable solvents are chiefly aliphatic ketones and nitriles, such as acetone, methyl ethyl, methyl isopropyl and methyl isobutyl ketone as well as aceto- and propionitrile, furthermore aromatic hydrocarbons, for example benzene, toluene, and xylene. It is just as possible, however, to work in an aqueous or aqueous-alcoholic medium, for example in a mixture of equal parts by volume of methanol and water.

It has also provide expedient to carry out the reaction at a slightly to moderately elevated temperature (30 to 100° C., preferably 40 to 70° C.) and to continue stirring the mixture, after the starting components have been combined, for some time (1 to 3 hours or overnight), possibly while heating at the stated temperature. In this case the products of the instant process are obtained with an especially high degree of purity and in excellent yields.

The asymmetric O,O-dialkyl- or O-alkyl-O-cycloalkyl-thiophosphoric acids to be used as starting materials for the process according to the present invention can be prepared according to the instructions given by G. Schrader in "Die Entwicklung neuer insektizider Phosphorsäureester," 3rd edition, Verlag Chemie, 1963, page 112, or in U.S. Patent No. 2,983,644, as follows:

A mixture consisting of 2 mols each of a linear aliphatic alcohol and a branched aliphatic or a cycloaliphatic alcohol is stirred at room temperature or slightly elevated temperature with 1 mol of phosphorus pentasulfide. The mixture of the corresponding asymmetric thiophosphoric acid and its two symmetric homologues formed in the course of 5 to 10 hours is then separated by fractional washing out of the water-soluble portions or by removing the component of more strongly acidic reaction with a deficient amount of alkali. The salts of the asymmetric O,O-dialkyl- or O-alkyl-O-cycloalkyl-thiophosphoric acids, which can easily be obtained in this way also on a large scale, are sufficiently pure for further reaction according to the present invention, alkali metal and ammonium salts being used preferably.

The N-halomethyl benzazimides to be used as the second starting component, especially the corresponding N-chlorine compounds have already been described in the literature (cf., for example, German patent specification No. 927,270).

After the usual working up of the reaction mixture, the products of the present process are usually first obtained in the form of colorless to pale yellow colored oils which solidify in crystalline form upon cooling or after standing for some time. The crystals thus obtained can easily be further purified in usual manner by washing with water followed by air-drying, or by recrystallization from the customary solvents or solvent mixtures such as benzene, ether (diethyl ether), petroleum ether, acetone, etc.

The thiol- or thionothiol-phosphoric acid esters which can be prepared according to the present invention are distinguished by outstanding pesticidal, especially insecticidal and acaricidal properties. The O-methyl-O-branched-alkyl compounds, and of these especially the O-methyl-O-isopropyl derivatives, have the greatest pesticidal effect.

Compared with the symmetric O,O-dialkyl-thiophosphoric acid esters of N-methyl benzazimide which are known from German patent specification No. 927,270 and commercially available as high quality preparations, the products of the present invention have a far superior selective activity against spider mites. This technically valuable superiority of the compounds obtainable according to the present invention, which is completely surprising, can be seen from the results of comparative tests summarized in the following table:

| Comp. No. | Constitution | Acaricidal effect when applied against resistant spider mites | |
|---|---|---|---|
| | | Concentr. of active subst., percent | Destruction of pests, percent |
| I | 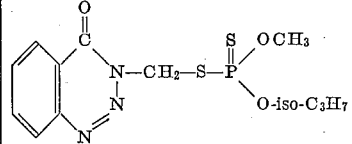<br>(according to instant invention, Example 1) | 0.01<br>0.004 | 100<br>40 |
| II | 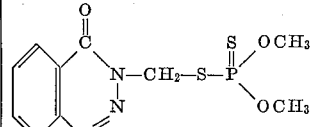<br>(known from German Patent Specification No. 927,270) | 0.01<br>0.004 | 0<br>0 |

Moreover, the O-methyl-O-isopropyl-thionothiol-phosphoric acid ester of N-methyl benzazimide which can be produced according to the present invention is distinguished specifically from the O,O-dimethyl compounds of analogous constitution by a lower solubility in water resulting in a reduced phytotoxicity. Finally, the product of the present process designated by Formula I above has a substantially higher thermal stability, compared with the known preparation designated by Formula II above.

On account of their outstanding pesticidal properties, their low water solubility, and their comparatively high thermal stability, the thiol- or thionothiol-phosphoric acid esters obtainable according to the present invention are useful as pest control agents, chiefly in plant protection.

It will be appreciated from the foregoing that a process for the production of asymmetric thiol and thionothiol-phosphoric acid esters may now be provided which is efficient and which produces the instant compounds in excellent yields as well as in an especially high degree of purity, the process comprising reacting N-halomethyl benzazimide with a member selected from the group consisting of asymmetric O,O-dialkyl-thiol-phosphoric acid, O-alkyl-O-cycloalkyl-thiol-phosphoric acid, O,O-dialkyl-thionothiol-phosphoric acid, and O-alkyl-O-cycloalkyl thionothiol-phosphoric acid, having the general formula

(II)

in which $R_1$ is a linear alkyl radical, $R_2$ is selected from the group consisting of a branched alkyl radical and a cycloalkyl radical, and X is a member selected from the group consisting of oxygen and sulfur, in the presence of an acid binding agent, to form the corresponding thio phosphoric acid ester of the formula

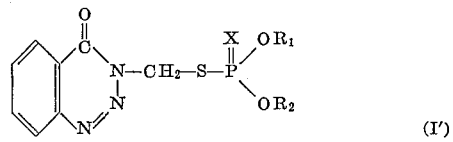

(I')

in which $R_1$, $R_2$ and X have the foregoing meaning.

The reaction is preferably carried out at a temperature substantially between about 30–100° C., and such reaction may be effected with the corresponding phosphoric acid salt in which case the presence of an acid binding agent is not required. Among the corresponding phosphoric acid salts which may be used are the alkali salts, such as the sodium, potassium, lithium and ammonium salts, the term alkali salt as used herein, i.e. both in the specification and claims defining both the alkali metal salts and ammonium salt.

The instant process may be carried out preferably in the presence of an inert solvent selected from the group consisting of aliphatic ketones, aliphatic nitriles, aromatic hydrocarbons, aqueous-aliphatic alcohol mixtures, and water. Thus, the aliphatic ketone solvents contemplated include especially dialkyl ketones, for example $C_3$–$C_{12}$ dilower alkyl ketones, such as acetone, methyl ethyl ketone, diethyl ketone, methyl isopropyl ketone, methyl isobutyl ketone, and the like, whereas the aliphatic nitriles contemplated include especially alkane nitriles, for example $C_1$–$C_4$ lower alkyl cyanides, such as acetonitrile, propionitrile, butyronitrile, and the like. Furthermore, the aromatic hydrocarbons include especially mononuclear aryl hydrocarbons, including mono- and di-lower alkyl substituted mononuclear aryl hydrocarbons, such as benzene, toluene, xylene and the like, whereas the aqueous-aliphatic alcohol mixtures contemplated include especially such aqueous-aliphatic alcohol mixtures as a mixture of water and an alkylol, especially a $C_1$–$C_6$ lower alkylol, for example methanol admixed with water.

The starting N-halomethyl benzazimides contemplates for example N-chloromethyl- and N-bromomethyl-benzazimides. On the other hand, the starting asymetric O,O-dialkyl- or O-alkyl-O-cycloalkyl-thiol- or thionothiol-phosphoric acids which may be used herein include those having the general formula noted above in which $R_1$ is a straight chain alkyl radical, preferably a $C_1$–$C_4$ straight chain lower alkyl radical, such as methyl, ethyl, n-propyl and n-butyl radicals, and in which $R_2$ is a branched chain alkyl radical, preferably a $C_3$–$C_6$ branched chain lower alkyl radical, such as isopropyl, isobutyl, secondary butyl, tertiary butyl, isoamyl, tertiary amyl, isohexyl, pinacolyl, etc., or a cycloalkyl radical preferably a $C_5$–$C_6$ cyclolower alkyl or lower cycloalkyl radical, such as cyclopentyl and cyclohexyl radicals, etc.

The products obtained by the process in accordance with the present invention may be purified, if desired, by recrystallization in the customary manner using such solvents or solvent mixtures in which the instant products are soluble, such as benzene, ether (i.e. diethyl ether), petroleum ether, acetone, etc., and mixtures thereof.

Because of the distinguishing properties of the instant compounds, the same may be used as pesticides, especially insecticides and acaricides which have a comparatively high thermal stability and a comparatively low solubility in water, rendering them useful in application on plant crops due to the inherent reduced phytotoxicity of these compounds.

Specifically, the instant compounds may be used per se or in the form of compositions with an inert dispersible carrier vehicle for applying to plant crops. Thus, the present invention contemplates further a method of combating pests which comprises applying to such pests and their habitat a pesticidal amount of a compound of the instant type.

The substances to be used according to the present invention can either be used as such, as the artisan will appreciate, or they may be combined with solid or liquid extenders or diluents customary for pesticides, i.e. carrier vehicles. Examples of such formulations with carrier vehicles are those with emulsifiable concentrates, spray powders, pastes, soluble powders, dusting agents and granulates. The production of such formulations is carried out in a known manner (compare for example Agricultural Chemicals, March 1960, pp. 35–38). Suitable dispersible liquid carrier vehicles or auxiliaries are mainly: solvents, such as, optionally halogenated, e.g. chlorinated, aromatic hydrocarbons (e.g. xylene, benzene, chlorobenzenes), paraffins (for example petroleum fractions), ether, alcohols (for example methanol, ethanol, butanol), and amines (such as ethanolamine or dimethyl formamide); whereas suitable finely divided solid carrier vehicles are, for example: natural or synthetic rock meals or powders (such as kaolin, chalk, i.e., calcium carbonate, alumina, talcum, highly disperse silicic acid and silicates, e.g. alkali silicates). Also, liquid emulsifiers, such as non-ionic and anionic emulsifiers (for example, polyoxyethylene-fatty acid esters, and polyoxyethylene-fatty alcohol ethers, alkyl- and aryl-sulfonates), especially magnesium stearate, sodium oleate, etc., may be used, as well as dispersing agents, for example lignin, sulfite waste liquors and methyl cellulose.

As will be appreciated, the active compounds used according to the instant invention may be present in such formulations in mixture with one another and with other known active substances.

The particular thiol- or thionothiol-phosphoric acid ester in accordance with the present invention may be applied advantageously in the form of a mixture with a major amount of the inert finely divided dispersible solid or inert dispersible liquid as carrier vehicle, the instant acid ester being present, for example, in a concentration of 0.01–0.004%.

Insofar as the instant process for preparing the novel compounds is concerned, the acid binding agents which may be used therein, as for example where the free acid rather than the corresponding acid salt is used as starting material, include alkali metal hydroxides, such as sodium hydroxide, potassium hydroxide, and lithium hydroxide, alkali metal carbonates, such as sodium carbonate, potassium carbonate, and lithium carbonate, alkali metal bicarbonates, such as sodium bicarbonate, potassium bicarbonate and lithium bicarbonate, and corresponding ammonium compounds, such as ammonium hydroxide, ammonium carbonate, and ammonium bicarbonate, as well as tertiary alkyl amines, such as triethyl amine, diethylmonomethyl amine, tripropyl amine, dimethylcyclohexyl amine, etc. Thus, $C_1$–$C_6$ trilower alkyl amines having various straight and branched chain substituents may be used, including the substituents methyl, ethyl, n-propyl, isopropyl, n-butyl, isobutyl, sec.-butyl, tert.-butyl, the amyls, and the hexyls, as well as $C_5$–$C_6$ cyclolower alkyl substituted amines including the substituents cyclopentyl, cyclohexyl, etc., and the corresponding mixed dialkyl and monocycloalkyl substituted- and monoalkyl and dicycloalkyl substituted-amines, wherein the alkyl substituent or substituents and the cycloalkyl substituent or substituents include the foregoing substituents.

The term linear alkyl and/or linear alkyl radical as used herein, i.e. both in the specification and claims, contemplates normal straight chain carbon chains, such as $C_1$–$C_{12}$ (methyl to dodecyl) alkyl chains, including especially $C_1$–$C_4$ (methyl to butyl) lower alkyl chains. Representative of the linear alkyl groups contemplated herein are, for example, methyl, ethyl, n-propyl, n-butyl, n-amyl, n-hexyl, n-heptyl, n-octyl, n-nonyl, n-decyl, n-undecyl, n-dodecyl, etc., i.e. those radicals derived from the paraffin series, including methane, ethane, propane, n-butane, n-pentane through n-dodecane, etc.

The term branched alkyl and/or branched alkyl radical as used herein, i.e. both in the specification and claims, contemplates branched carbon chains such as $C_3$–$C_{12}$ (isopropyl to branched dodecyl) branched alkyl chains, including especially $C_3$–$C_6$ (isopropyl to branched hexyl), branched lower alkyl chains. Among the branched substituents which may be included are $C_1$–$C_6$ (methyl to hexyl) lower alkyl side chains which may be normal or branched, i.e. substituted with further lower alkyl groups ($C_1$–$C_4$).

Representative of the branched alkyl groups contemplated herein are, for example, isopropyl, isobutyl, sec.-butyl, tert.-butyl, isoamyl, tert.-amyl, isohexyl, pinacolyl, etc., i.e. those radicals derived from the branched chain paraffin series, including propane, isobutane (2-methyl propane), isopentane (2-methyl butane), tert.-pentane (2,2-dimethyl propane), 2-methyl pentane, 3-methyl pentane, 2,2-dimethyl butane, 2,3-dimethyl butane, etc., 2-methyl hexane, 3-methyl hexane, 2,2-dimethyl pentane, 2,3-dimethyl pentane, 2,4-dimethyl pentane, 3,3-dimethyl pentane, 3-ethyl pentane, 2,2,3-trimethyl butane, etc., the corresponding branched octanes, nonanes, decanes, undecanes, dodecanes, etc.

The term cycloalkyl and/or cycloalkyl radical as used herein, i.e. both in the specification and claims, contemplates substituted and unsubstituted aliphatic cyclic carbon chains, such as $C_3$–$C_8$ (cyclopentyl to cyclooctyl) cycloalkyl chains, especially cyclo lower radicals ($C_5$–$C_6$), and including those radicals in which the replaceable hydrogen atom is located on an open alkyl chain substituent attached to a ring carbon atom of the cyclic moiety. Among the substituents which may be included on the ring are $C_1$–$C_6$ (methyl to hexyl) lower alkyl chains which may be normal or branched, i.e. substituted with further lower alkyl groups ($C_1$–$C_4$) carbon chains. Representative of the cycloalkyl groups contemplated herein are, for example, cyclopentyl, cyclohexyl, the corresponding methyl, ethyl, propyl, butyl, etc., butenyl substituted cycloalkyl radicals, such as methyl cyclopentyl, 1,2-dimethyl cyclopentyl, 1,3-dimethyl cyclopentyl, propyl cyclopentyl, ethyl cyclohexyl, butyl cyclohexyl, 1,2,4-trimethyl cyclohexyl, etc.

The term linear lower alkyl and/or linear lower alkyl radical as used herein, i.e. both in the specification and claims, contemplates straight chain $C_1$–$C_4$ lower alkyl chains, such as methyl, ethyl, n-propyl and n-butyl, whereas the term branched chain lower alkyl and/or branched chain lower alkyl radical as used herein, i.e. both in the specification and claims, contemplates branched $C_3$–$C_6$ lower alkyl chains, such as isopropyl, isobutyl, sec.-butyl, tert.-butyl, isoamyl, tert.-amyl, 2-methyl amyl, 3-methyl amyl, 2,2-dimethyl butyl, 2,3-dimethyl butyl, etc.

The term cyclo lower alkyl and/or lower cycloalkyl as used herein, i.e. both in the specification and claims, contemplates substituted and unsubstituted alicyclic $C_3$–$C_6$ saturated rings, including lower alkyl ($C_1$–$C_4$) substituted saturated rings such as cyclopentyl, cyclohexyl, methyl cyclohexyl, dimethyl cyclohexyl, trimethyl cyclohexyl, ethyl cyclohexyl, diethyl cyclohexyl, n-propyl cyclohexyl, isopropyl cyclohexyl, n-butyl cyclohexyl, isobutyl cyclohexyl, sec. butyl cyclohexyl, tert. butyl cyclohexyl, etc.

In general, the asymmetric thiophosphoric acid esters of the formula

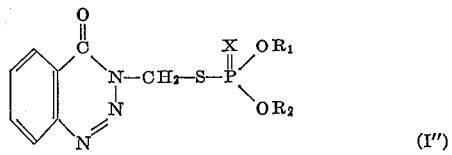

(I'')

in which R is a linear alkyl radical, $R_2$ is selected from the group consisting of a branched alkyl radical and a cycloalkyl radical, and X is a member selected from the group consisting of oxygen and sulfur, may be used in compositions and preparations in admixture with a dispersible carrier vehicle in amounts of from about 0.1 to 95 percent by weight of the active compound the remainder being the carrier vehicle. Nevertheless, the active compound may be used in a concentration of from about 5 to 0.0005 percent, especially where the preparation is applied by spraying, dusting, sprinkling, atomizing, etc., although as aforesaid a concentration of from about 0.01–0.004 percent has been found most effective. Such preparations may be applied onto plant crops infested with pests, and especially insects and acarids, e.g. spider mites.

In particular, asymmetric thiophosphoric acid esters contemplated herein include those of the formula

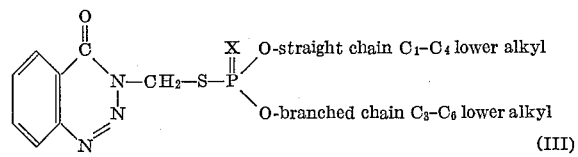

(III)

in which X is selected from the group consisting of oxygen and sulfur, and those of the formula

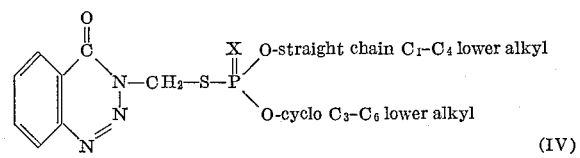

(IV)

in which X has the foregoing meaning.

The following examples are given for the purpose of illustrating the invention.

*Example 1*

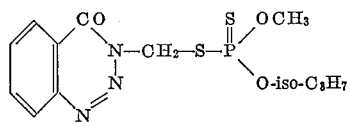

To a solution of 48.5 g. (0.25 mol) of N-chloromethyl-benzazimide (M.P. 125° C.) in 150 cc. of acetone are added 56 g. (0.27 mol) of O-methyl-O-isopropyl-thionothiol-phosphoric acid ammonium salt (M.P. 165° C. with decomposition), and the mixture is further stirred at 45 to 50° C. for 2 hours or at room temperature overnight. The precipitated ammonium chloride is subsequently filtered off with suction and the solvent is distilled off from the filtrate in a vacuum. The residual oil is taken up with benzene, the benzene solution is washed first with water and thence once with a sodium hydrogen carbonate solution. After drying the organic phase over sodium sulphate and distilling off the solvent, the O-methyl-O-isopropyl - S - (3,4 - dihydro - 4 - oxo - 1,2,3 - benzotriazin-3-yl-methyl)-thionothiol-phosphoric acid ester is obtained as a pale yellow viscous oil which crystallizes slowly. The yield is 71 g. (82.4% of the theoretical). After recrystallization from a mixture of ether and petroleum ether (1:1) the product is obtained in the form of colorless small needles of M.P. 68° C.

*Analysis.*—Calculated for molecular weight 345.4: N, 12.17%; S, 18.53%; P, 8.97%. Found: N, 12.26%; S, 18.59%; P, 9.07%.

The mean toxicity ($LD_{50}$) of the compound on rats per os is 5 mg. per kg. animal weight.

*Example 2*

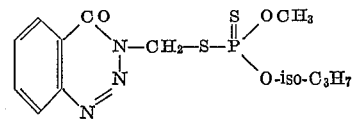

A solution of 114.5 g. (0.55 mol) of O-methyl-O-isopropyl-thionothiol-phosphoric acid sodium salt in 360 cc. of water and 360 cc. of methanol is stirred with 97.5 g. (0.5 mol) of N-chloromethyl-benzazimide at 50 to 60° C. for 2 hours. An oil has formed after a short time. During the reaction, a pH value of 7 to 7.5 is maintained in the reaction mixture by the dropwise addition of about 5 cc. of 2 N sodium hydroxide solution. When cooling the mixture with rapid stirring, the oil solidifies in the form of a ball. The crystalline mass is filtered off with suction, washed with water and the crystals are air-dried. The yield is 132 g. (76.6% of the theoretical). The O-methyl - O - isopropyl - S - (3,4 - dihydro - 4 - oxo - 1,2,3-benzotriazin-3-yl-methyl)-thionothiol-phosphoric acid ester thus obtained has a melting point of 65° C.

Analysis and mean toxicity data were similar to that of Example 1.

*Example 3*

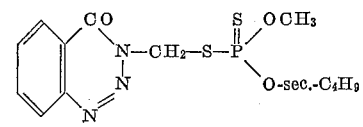

111 g. (0.5 mol) of O-methyl-O-sec.-butyl-thionothiol-phosphoric acid sodium salt are dissolved in 400 cc. of acetonitrile. 94 grams (0.5 mol) of N-chloromethyl-benzazimide are added to this solution with stirring, the mixture is subsequently further stirred at 60 to 70° C. for 3 hours and then cooled to room temperature. The reaction mixture is then poured into 400 cc. of ice water, the separated oil is taken up with 400 cc. of benzene, the benzene solution washed several times with 50 cc. of water each time, the organic phase is dried over sodium sulphate and the solvent finally evaporated in a vacuum. The remaining residue is heated for a half hour under a pressure of 0.5 mm. Hg at a bath temperature of 70 to 80° C. In this way, 138 g. (77% of the theoretical) of O - methyl - O - sec. - butyl - S - (3,4 - dihydro - 4 - oxo-1,2,3 - benzotriazin - 3 - yl - methyl) - thionothiol - phosphoric acid ester are obtained in the form of a viscous, water-insoluble oil.

*Analysis.*—Calculated for molecular weight 359: P, 8.7%; S, 17.8%; N, 11.7%. Found: P, 9.1%; S, 18.2%; N, 10.8%.

The mean toxicity ($LD_{50}$) of the compound on rats per os is 5 mg. per kg. animal weight.

Caterpillars of the type *Plutella maculipennis* are killed 80% even by 0.004% solutions of the ester. Spider mites are completely destroyed by 0.02% solutions and are even killed 40% by 0.004% solutions. Spider mites are killed 80% even by 0.0008% solutions of the compound.

*Example 4*

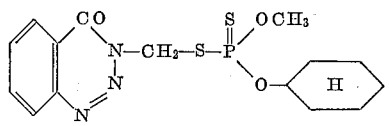

124 grams (0.5 mol) of O-methyl-O-cyclohexyl-thionothiol-phosphoric acid sodium salt are dissolved in 400 cc.

of acetonitrile, 94 g. of N-chloromethyl-benzazimide are added to this solution while stirring, the reaction mixture is subsequently further stirred at 60 to 70° C. for 3 hours and then worked up as described in Example 3. As the residue there are obtained 108 g. (56% of the theoretical) of O - methyl - O-cyclohexyl-S-(3,4-dihydro-4-oxo-1,2,3-benzotriazin - 3 - yl-methyl)-thionothiol-phosphoric acid ester in the form of a viscous water-insoluble oil. After standing for a short time, the compound solidifies in crystalline form and has then a melting point of 78° C.

*Analysis.*—Calculated for molecular weight 385: P, 8.1%; S, 16.6%; N, 10.9%. Found: P, 8.5%; S, 16.8%; N, 10.4%.

On rats per os the product has a mean toxicity ($LD_{50}$) of 5 mg. per kg. animal weight.

Ticks are completely destroyed by 0.01% solutions and are even destroyed 25% by 0.001% solutions. Larvae of flies are completely killed by 0.01% solutions and are even killed 40% by 0.001% solutions.

*Example 5*

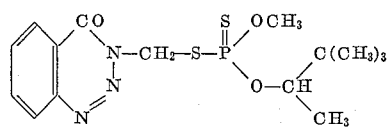

75 grams (0.3 mol) of O-methyl-O-pinacolyl-thionothiol-phosphoric acid sodium salt are dissolved in 300 cc. of acetonitrile. 59 grams of N-chloromethyl-benzazimide are added to this solution with stirring. During the addition the temperature of the reaction mixture rises spontaneously to about 45° C. The mixture is subsequently heated at 60 to 70° C. for 2 hours and then worked up as described in the preceding examples. 74 grams (64% of the theoretical) of O-methyl-O-pinacolyl-S-(3,4-dihydro - 4 - oxo - 1,2,3-benzotriazin-3-yl-methyl)-thionothiol-phosphoric acid ester of melting point 73 to 74° C. are obtained. The compound is soluble in organic solvents, but in water it dissolves only with difficulty.

*Analysis.*—Calculated for a molecular weight of 387: P, 8.0%; S, 16.6%; N, 10.7%. Found: P, 8.3%; S, 17.1%; N, 11.1%.

The mean toxicity of the compound on rats per os amounts to 250 mg. per kg. animal weight. Caterpillars of the type *Plutella maculipennis* are completely destroyed by 0.01% solutions of the ester.

*Example 6*

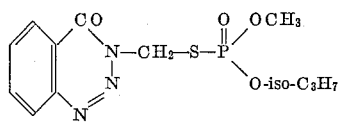

A solution of 53 g. (0.25 mol) of O-methyl-O-isopropyl-thiol-phosphoric acid potassium salt in 250 cc. of acetone is treated while stirring with 54 g. (0.25 mol) of N-bromomethyl-benzazimide, the mixture is subsequently heated at 50° C. for one hour, then cooled to room temperature and poured into 500 cc. of ice water. The separated oil is taken up with 300 cc. of ether, the ether solution neutralized with a 30% sodium bicarbonate solution, subsequently dried over sodium sulphate and the solvent is finally evaporated in a vacuum. The remaining oily residue is heated under a pressure of 1 mm. Hg at a bath temperature of 50° C. for a short time, and 60 g. (73% of the theoretical) of O-methyl-O-isopropyl-S-(3,4 - dihydro - 4 - oxo-1,2,3-benzotriazin-3-yl-methyl)-thiolphosphoric acid ester are thus obtained in the form of a water-insoluble yellow oil.

*Analysis.*—Calculated for molecular weight 329: N, 12.76%; S, 9.74%; P, 9.41%. Found: N, 12.33%; S, 9.9%; P, 9.29%.

*Example 7*

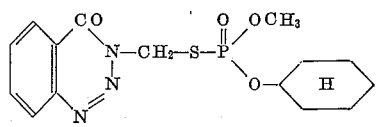

82 grams (0.3 mol) of O-methyl-O-cyclohexyl-thiolphosphoric acid ammonium salt are dissolved in 200 cc. of acetone. To this solution are added 72 g. (0.3 mol) of N-bromomethyl benzazimide dissolved in 200 cc. of acetone, the mixture is subsequently heated 40 to 50° C. for one hour, then cooled to room temperature and worked up as described in Example 6. 82 grams (74% of the theoretical) of O-methyl-O-cyclohexyl-S-(3,4-dihydro - 4 - oxo - 1,2,3-benzotriazin-3-yl-methyl)-thiol-phosphoric acid ester are obtained in the form of a water-insoluble yellow oil.

*Analysis.*—Calculated for molecular weight 369: N, 11.38%; S, 8.68%; P, 8.39%. Found: N, 10.82%; S, 8.87%; P, 8.37%.

On rats per os the mean toxicity of the compound is 25 mg. per kg. animal weight. Caterpillars of the type *Plutella maculipennis* are completely killed by 0.1% solutions and are even destroyed 90% by 0.02% solutions. Aphids are completely killed by 0.1% solutions and are even destroyed 50% by 0.04% of the ester. Spider mites are killed 100% by 0.004% and even 60% by 0.008% solutions.

Example 1 is repeated using in similar quantities O-methyl-O-sec.-butyl- and O-methyl-O-pinacolyl-thiol-phosphoric acid ammonium salt, respectively; O-methyl-isobutyl-; O-methyl-O-tert. butyl-; O-methyl-O-isoamyl-; O-methyl-O-tert. amyl-; O-methyl-O-isohexyl-; O-methyl-O-cyclopentyl-; and O-methyl-O-cyclohexyl-thiol-phosphoric acid ammonium salt, respectively, or the corresponding thiono-thiol-phosphoric acid ammonium salt, respectively; the corresponding O-ethyl-, O-n-propyl-, O-n-butyl-, O-n-amyl-, and O-n-hexyl-, substituted and corresponding O-isopropyl-, sec. butyl-, tert. butyl-, isoamyl-, tert. amyl-, isohexyl-, pinacolyl-, cyclopentyl-, and cyclohexyl-substituted thiol-phosphoric acid ammonium salt, respectively, and the corresponding thionothiol-phosphoric acid ammonium salt, respectively; and the corresponding potassium and sodium salts as well, in place of the O-methyl-O-isopropyl-thionthiol - phosphoric acid ammonium salt of Example 1, and similar results are obtained, with the corresponding O-linear alkyl-O-branched alkyl or cycloalkyl-S-(3,4-dihydro-4-oxo-1,2,3-benzotriazin - 3-yl-methyl)-thiol- and thionothiol-phosphoric acid esters, as the case may be, being produced.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Asymmetric thiophosphoric acid esters of the formula

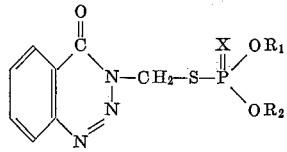

in which $R_1$ is linear alkyl, $R_2$ is selected from the group consisting of branched alkyl and cycloalkyl, and X is a member selected from the group consisting of oxygen and sulfur.

2. Asymmetric thiophosphoric acid esters of the formula

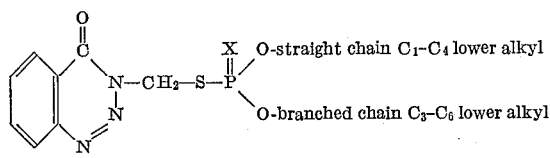

in which X is selected from the group consisting of oxygen and sulfur.

3. Asymmetric thiophosphoric acid esters of the formula

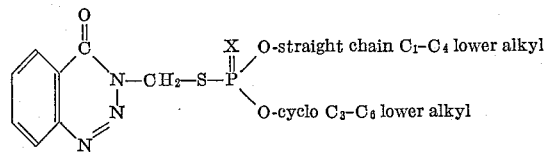

in which X is selected from the group consisting of oxygen and sulfur.

4. O-methyl-O-isopropyl-S-(3,4-dihydro-4-oxo - 1,2,3-benzotriazin-3-yl-methyl) - thionothiol - phosphoric acid ester.

5. O-methyl-O-sec.-butyl-S-(3,4-dihydro-4-oxo - 1,2,3-benzotriazin-3-yl-methyl) - thionothiol - phosphoric acid ester.

6. O-methyl-O-cyclohexyl-S-(3,4-dihydro-4-oxo - 1,2,3-benzotriazin-3-yl-methyl) - thionothiol - phosphoric acid ester.

7. O-methyl-O-pinacolyl-S-(3,4-dihydro-4-oxo - 1,2,3-benzotriazin-3-yl-methyl) - thionothiol - phosphoric acid ester.

8. O-methyl-O-isopropyl-S-(3,4-dihydro-4-oxo - 1,2,3-benzotriazin-3-yl-methyl)-thiol-phosphoric acid ester.

9. O-methyl-O-cyclohexyl-S-(3,4-dihydro-4-oxo - 1,2,3-benzotriazin-3-yl-methyl)-thiol-phosphoric acid ester.

10. Pesticidal preparation comprising a carrier vehicle and as active ingredient an asymmetric thiophosphoric acid ester of the formula

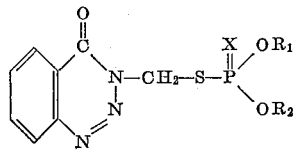

in which $R_1$ is linear alkyl, $R_2$ is selected from the group consisting of branched alkyl and cycloalkyl, and X is a member selected from the group consisting of oxygen and sulfur.

11. Pesticidal preparation comprising a mixture of a major amount of an inert dispersible carrier vehicle with an amount sufficient to combat pests of an asymmetric thiophosphoric acid ester of the formula

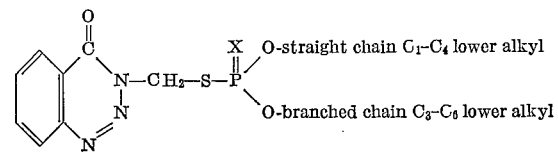

in which X is selected from the group consisting of oxygen and sulfur.

12. Pesticidal preparation comprising a mixture of a major amount of an inert dispersible carrier vehicle with an amount sufficient to combat pests of an asymmetric thiophosphoric acid ester of the formula

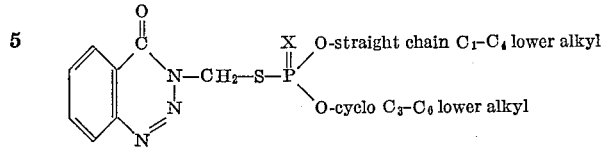

in which X is selected from the group consisting of oxygen and sulfur.

13. Pesticidal preparation comprising a mixture of a major amount of an inert dispersible carrier vehicle with an amount sufficient to combat pests of O-methyl-O-isopropyl-S-(3,4-dihydro-4-oxo-1,2,3-benzotriazine - 3 - yl-methyl)-thionthiol-phosphoric acid ester.

14. Pesticidal preparation comprising a mixture of a major amount of an inert dispersible carrier vehicle with an amount sufficient to combat pests of O-methyl-O-sec.-butyl-S-(3,4-dihydro-4-oxo-1,2,3 - benzotriazine - 3 - yl-methyl)-thionothiol-phosphoric acid ester.

15. Pesticidal preparation comprising a mixture of a major amount of an inert dispersible carrier vehicle with an amount sufficient to combat pests of O-methyl-O-cyclohexyl-S-(3,4-dihydro-4-oxo-1,2,3 - benzotriazine - 3 - yl-methyl)-thionothiol-phosphoric acid ester.

16. Pesticidal preparation comprising a mixture of a major amount of an inert dispersible carrier vehicle with an amount sufficient to combat pests of O - methyl - O-pinacolyl-S-(3,4-dihydro-4-oxo-1,2,3-benzotriazine-3 - yl-methyl)-thionothiol-phosphoric acid ester.

17. Pesticidal preparation comprising a mixture of a major amount of an inert dispersible carrier vehicle with an amount sufficient to combat pests of O-methyl-O-isopropyl-S-(3,4-dihydro-4-oxo-1,2,3-benzotriazine - 3 - yl-methyl)-thiol-phosphoric acid ester.

18. Pesticidal preparation comprising a mixture of a major amount of an inert dispersible carrier vehicle with an amount sufficient to combat pests of O-methyl-O-cyclohexyl-S-(3,4-dihydro-4-oxo - 1,2,3 - benzotriazin - 3 - yl-methyl)-thiol-phosphoric acid ester.

19. Method of combating insect and acarid pests which comprises applying to at least one of (a) such insect pests, (b) such acarid pests, and (c) the corresponding habitat a pesticidal amount of an asymmetric thiophosphoric acid ester of the formula

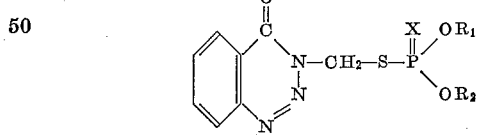

in which $R_1$ is linear alkyl, $R_2$ is selected from the group consisting of branched alkyl and cycloalkyl, and X is a member selected from the group consisting of oxygen and sulfur.

20. Method of combating insect and acarid pests which comprises applying to at least one of (a) such insect pests, (b) such acarid pests, and (c) the corresponding habitat a pesticidal amount of an asymmetric thiophosphoric acid ester of the formula

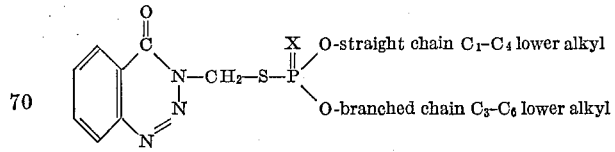

in which X is selected from the group consisting of oxygen and sulfur.

21. Method of combating insect and acarid pests which comprises applying to at least one of (a) such insect pests, (b) such acarid pests, and (c) the corresponding habitat a pesticidal amount of an asymmetric thiophosphoric acid ester of the formula

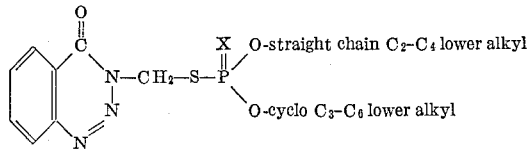

in which X is selected from the group consisting of oxygen and sulfur.

22. Method of combating insect and acarid pests which comprises applying to at least one (a) such insect pests, (b) such acarid pests, and (c) the corresponding habitat a pesticidal amount of O-methyl-O-isopropyl-S-(3,4-dihydro-4-oxo-1,2,3-benzotriazin-3-yl - methyl) - thionothiolphosphoric acid ester.

23. Method of preventing acarid infestation of plant crops which comprises applying to such plant crops an acaricidal amount of an asymmetric thiophosphoric acid ester of the formula

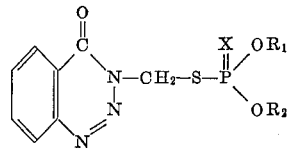

in which $R_1$ is linear alkyl, $R_2$ is selected from the group consisting of branched alkyl and cycloalkyl, and X is a member selected from the group consisting of oxygen and sulfur.

References Cited by the Examiner

UNITED STATES PATENTS 2,758,115  8/1956  Lorenz _____ 260—248
3,089,807  5/1963  Trandesman _____ 167—22

JULIAN S. LEVITT, *Primary Examiner.*

STANLEY J. FRIEDMAN, *Assistant Examiner.*